Dec. 14, 1926.
E. L. MABIE
METER
Filed April 24, 1926
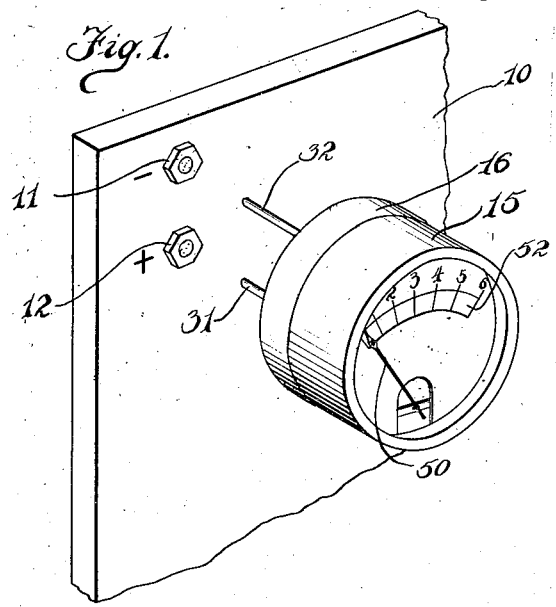
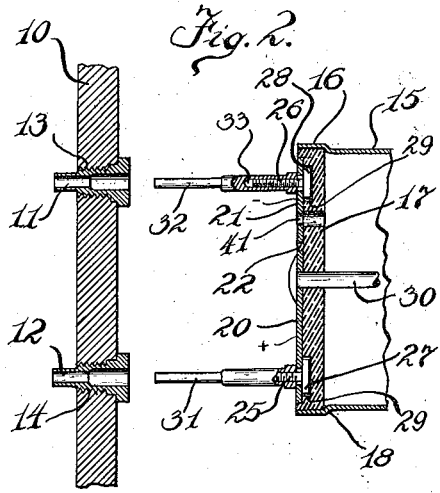
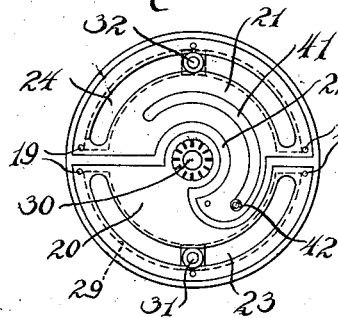
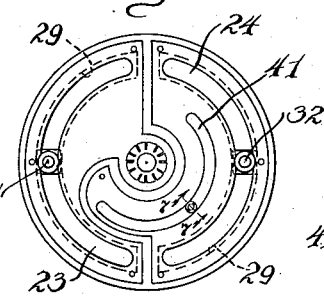
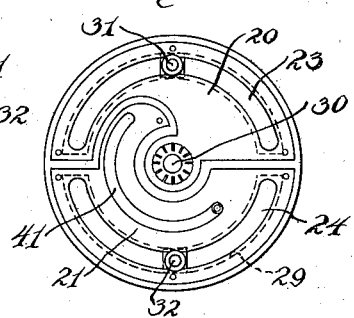
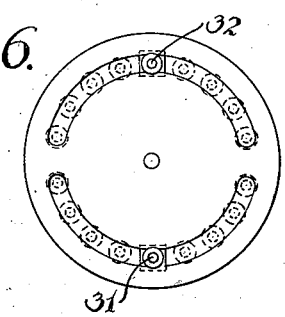
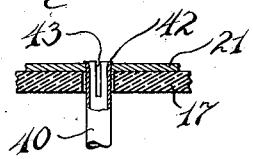
Inventor
Edmund L. Mabie
By Williams, Bradbury,
McCaleb & Hinkle
Attorneys Patented Dec. 14, 1926.

1,610,304

UNITED STATES PATENT OFFICE.

EDMUND L. MABIE, OF CHICAGO, ILLINOIS, ASSIGNOR TO JEWELL ELECTRICAL INSTRUMENT COMPANY, OF CHICAGO, ILLINOIS, A CORPORATION OF ILLINOIS.

METER.

Application filed April 24, 1926. Serial No. 104,281.

This invention relates to meters and particularly to meters such for instance as ammeters which are adapted to be arranged on instrument boards or mounting plates as of radio sets or the like by a detachable plug and socket connection.

There appears to be no general manner adopted by manufacturers as to the arrangement on the instrument board of the sockets for receiving the terminal plugs of meters. For instance, in some cases the sockets will be arranged vertically one above the other, in others they will be arranged horizontally, in some they may be arranged diagonally on the board and in boards of sets of different manufacture the position of the positive and negative socket terminals may be reversed, thus causing great confusion and making it difficult for meter manufacturers to provide meters which will appear with the correct side of the dial uppermost when applied to the plug sockets on boards of different characters.

The object of the present invention, is therefore, the provision of a meter having plug terminal attaching means which will permit it to assume an upright position regardless of the relative positions of the sockets on the mounting board.

One of the features of the invention is the provision of means whereby the plug terminals of the meter may be adjusted in a rotary direction about the meter to accomplish the above purpose and the provision of further means which will permit the adjustment of the meter dial in relation to the terminal plugs.

It is believed the further disclosure of the invention will be understood most readily from a detailed description thereof taken in connection with the accompanying drawings, in which:

Fig. 1 shows a mounting board with a meter so positioned therebefore that its terminal plugs may be inserted in the plug sockets of the board.

Fig. 2 is a section through the board and meter of Fig. 1;

Fig. 3 is a view of the back of the meter showing the plugs thereof arranged in a substantially vertical plane;

Fig. 4 shows the terminal plugs of the meter arranged in a substantially horizontal plane, and the meter housing so adjusted in relation to the supporting plate for the plugs that the top of the dial will be uppermost;

Fig. 5 is a view similar to Fig. 3, but shows the position of the terminal plugs of the meter reversed, that is, with the plug which is lowermost in Fig. 3 uppermost in Fig. 5, and with the meter housing rotated through an angle of substantially 180 degrees in relation to the mounting plate for the plugs;

Fig. 6 diagrammatically indicates various positions the plugs may assume in relation to the plug mounting plate, and Fig. 7 is a section through a portion of the rear plate of a meter substantially on the line 7—7 of Fig. 4.

Referring now to the drawings, in which like reference characters indicate the same parts in the several views, 10 indicates the mounting board having therein the plug sockets 11 and 12. In the present disclosure of the invention these sockets are shown with threaded portions 13 and 14 which are adapted to be turned into openings in the board 10. However, the socket structure forms no part of the present invention and any other mounting arrangement may be employed.

The ammeter herein disclosed is contained in a cylindrical housing member 15 having the outwardly offset portion 16 within which is mounted a mounting disc or plate 17 of insulating material. Disc 17 rests upon the shoulder 18 formed between the parts 15 and 16 of the shell. Secured to the insulating disc 17 as by means of rivets 19 are a pair of metal plates 20 and 21, separated along the irregular space 22. Plate 20 is provided therein with a curved slot 23 which is substantially parallel to the outer edge of the plate and extends through an arc of about one-hundred and seventy-five (175) degrees. Plate 21 is provided with a similar slot 24. Extending through the slots 23 and 24 are the threaded members 25 and 26, provided with the square heads 27 and 28 which underlie the plates 20 and 21, respectively, and are received by arcuate grooves 29 in the fibre mounting disc 17. The insulating plate 17 with the metallic plates 20 and 21 are retained in position by means of the bolt or rivet 30 which likewise forms an electrical connection between plate 20 and one terminal of the meter.

The terminal plugs 30 and 31 are provided with longitudinally extending threaded bores, such as shown at 33, arranged to receive the projecting threaded ends of members 25 and 26. Thus by rotating the plugs 31 and 32, they may be adjusted along the members 25 and 26 firmly to clamp the plates 20 and 21, respectively, between the heads 27 and 28 and the inner ends of the plugs 31 and 32. The threaded members 25 and 26 are prevented from rotating by the square heads 27 and 28 engaging with the respective slots 29 in which they are positioned.

As above explained, plate 20, and consequently terminal plug 31, is joined to one meter terminal by means of the bolt or rivet 30. The other meter terminal is joined to the brush or contact 40, the inner end of which is fixed in the meter structure, the outer end being arranged to project through aligned slots in the insulating disc 17 and plate 21. This slot is indicated generally at 41. The outer end 42 of brush 40 is longitudinally slotted, as indicated at 43, so that the opposite sides resiliently engage the edges of the slot 41 in plate 21 and make wiping electrical contact therewith as the brush is moved back and forth along slot 41, thus extending the electrical connection from the other meter terminal to the plug 32.

In Fig. 1 is shown the face of the meter having the pointer 50 thereon adapted to be moved over the graduated arc 52 responsive to the flow of electrical current through the meter. It is, of course, desirable that the meter always be applied to the board so that the arc 52 is uppermost regardless of the arrangement of the plug sockets on the board.

We will assume that the socket 12 of Fig. 1 is positive and socket 11 is joined to the negative pole. We, also, will assume that the plug 31 is connected to the positive terminal of the meter and plug 32 to the negative, as indicated on the drawings. Thus in applying the meter to sockets 11 and 12, plug 32 will be uppermost and the adjustable elements at the back of the meter may appear as in Fig. 3 with the plugs 31 and 32 substantially midway of their mounting slots 23 and 24, respectively. Also, the meter housing comprising members 15 and 16 will be rotated relative to plates 17, 20 and 21 in a clockwise direction, as seen in Fig. 1, until brush 42 is substantially at the end of its slot 41. This rotary adjustment between housing 15 and plate 17 is possible on account of plate 17 being merely frictionally retained in engagement with shoulder 18 by the securing member 30. It will thus be seen that not only may the plugs be adjusted through arcs of nearly one hundred and eighty (180) degrees, but the meter housing may be adjusted through an arc of about 180 degrees in relation to the plate on which the plugs are mounted.

We will next assume that the positive socket, as 12, is at the left and the negative socket at the right. The adjustable parts of the meter will now be positioned, as shown in Fig. 4, which will still operate to place the arc 52 uppermost.

If we assume that the positive socket is uppermost and the negative socket thereunder, the meter parts will be adjusted, as shown in Fig. 5, with plug 31 arranged at the top of the meter and plug 32 at the bottom. This figure shows the meter housing, as seen in Fig. 1, rotated in a counterclockwise direction, in relation to plate 17 until brush 42 occupies that end of slot 41 opposite to the end occupied in Fig. 3.

It is thought unnecessary for a full disclosure of the invention to describe the positions assumed by the parts of the meter when associated with sockets having other relative positions, as diagonal, for it is believed obvious from the explanation above that the plugs are so connected to the meter housing as to permit of adjustment to accommodate all socket arrangements and still place the meter arc 52 uppermost.

While in the drawings and in the above description but a single form of the invention has been disclosed, it is to be understood that many modifications in the details of construction are contemplated. The invention, therefore, should be held to include all forms of the invention included by the scope of the appended claims.

Having thus described my invention, what I claim as new and desire to secure by Letters Patent of the United States is:

1. In a device of the class described, a housing, a mounting plate carried by said housing and terminal plugs adjustably supported on said mounting plate.

2. In a meter, a housing, a pair of contact plates carried by said housing on opposite sides thereof, terminal plugs, one electrically joined to each of said plates and means for permitting adjustment of said plugs on said plates, respectively, along arcuate lines.

3. In a meter, a housing, a pair of metal contact plates carried by said housing, said contact plates being provided, respectively, with arcuate slots therein, terminal plugs extending through said slots, respectively, and means for securing said plugs at desired positions in said lots.

4. In a meter, a housing, a pair of metal contact plates carried by said housing, said plates being provided, respectively, with arcuate slots therein, terminal plugs, each extending through one of said slots and making electrical contact with its said plate, each of said plugs comprising a portion positioned on one side of its plate together with a screw threaded portion extending through the slot to the other side of the plate and a screw threaded member adjustable on its said screw threaded portion.

5. In a meter, a housing, a mounting plate rotatably mounted on said housing, a pair of contact plates carried by said mounting plate, terminal plugs, one electrically joined to each of said contact plates, means permitting adjustment of said plugs on said contact plates, respectively, terminals for the said meter and means electrically connecting said terminals to said contact plates, respectively, one of said connecting means including a brush having wiping engagement with one of said contact plates.

6. In a meter, a housing, a mounting plate rotatably mounted on said housing, a pair of contact plates carried by said mounting plate at opposite sides thereof, terminal plugs, one electrically joined to each of said contact plates, means permitting adjustment of said plugs on said plates along substantially arcuate lines, terminals for the said meter and means electrically connecting said terminals to said contact plates, respectively, one of said connecting means including a brush having wiping engagement with one of said contact plates, the other connecting means comprising a member extending through one of said contact plates and said mounting plate at substantially its axis of rotation.

7. In a meter, a housing, a mounting plate adjustably mounted on said housing, a pair of contact plates carried by said mounting plate, said contact plates having arcuate slots therein, terminal plugs, one electrically joined to each of said plates, each plug including a portion extending through the slot of its respective plate, terminals for said meter and means electrically connecting said terminals to said contact plates, respectively, one of said connecting means including a brush having wiping engagement with one of said contact plates.

8. In a meter, a housing, a mounting plate adjustably mounted on said housing, contact plates carried by said mounting plate, terminal plugs, one electrically joined to each of said plates, terminals for said meter and means electrically connecting said terminals to said contact plates, respectively, one of said connecting means including a brush having wiping engagement with one of said contact plates.

9. In a meter, a housing, a mounting plate rotatably mounted on said housing, a pair of contact plates carried by said mounting plate, a stud passing through said mounting plate at substantially its axis of rotation, terminals plugs, one electrically joined to each of said contact plates, terminals for the said meter, and means connecting said terminals to said contact plates, respectively, one of said connecting means including a brush having wiping engagement with one of said contact plates, the other said connecting means including said stud.

10. In a meter, a substantially cylindrical housing, a mounting plate rotatably mounted within said housing, a pair of contact plates carried by said mounting plate, a stud passing through one of said contact plates and said mounting plate at substantially its axis of rotation, terminal plugs, one electrically joined to each of said contact plates, terminals for the said meter, and means connecting said terminals to said contact plates, respectively, one of said connecting means including a brush having wiping engagement with one of said contact plates, the other said connecting means including said stud.

11. In a meter, a housing, a mounting plate, a pair of slotted plates carried by said mounting plate, terminal plugs slidably secured in said slotted plates to permit adjustment of said plugs relative to said housing and to each other, and means to permit rotative movement of said housing relative to said mounting plate.

12. In a meter, a housing for enclosing an electrical measuring instrument, a mounting plate rotatable relative to said housing, a pair of separated slotted plates secured to said mounting plate, terminal plugs slidably secured in said slotted plates to permit said plugs to be inserted in sockets of any desired relative location, means permitting the rotation of said housing relative to said slotted plates, and means for maintaining electrical connections from said plates to said measuring instrument throughout the rotative movement of said housing.

13. In a meter, a housing for enclosing an electrical instrument, a mounting support, a pair of conducting plates secured to said mounting support, means for rotatably securing said mounting support to said housing comprising a headed pin in electrical contact with one of said plates and with a terminal of said instrument, and a sliding contact between the other of said plates and the other terminal of said instrument so that said instrument and housing may be rotated relative to said plates.

14. In a meter, a housing, a mounting plate adjustably mounted in said housing, contact plates carried by said mounting plate, terminal plugs, one electrically joined to each of said plates, terminals for said meter, and means for electrically connecting said terminals to said contact plates respectively and permitting rotation of said housing relative to said contact plates.

15. In a meter, a substantially cylindrical housing, a mounting plate rotatably mounted within said housing, contact plates carried by said mounting plate, terminal plugs adapted to be adjustably positioned in said contact plates, terminals for said meter, means for connecting said meter terminals to said contact plates respectively comprising a spindle coaxial with said housing and rotatable in one of said contact plates and a sliding contact member electrically connected to one of said meter terminals and slidable in a slot formed in the other of said contact plates, so as to permit rotative movement of said meter and housing relative to said mounting plate.

16. In a meter, a supporting base, a plurality of electrical connectors extending from said base, an electrical measuring instrument on said base having a dial, and adjustable electrical connections between said instrument and said connectors enabling said instrument to be supported by said connectors in any rotative position about a horizontal axis.

In testimony whereof I have signed this specification.

EDMUND L. MABIE.